July 11, 1933.   F. W. JUENGST ET AL   1,918,186
SUPPORT FOR CULINARY APPLIANCES
Filed March 18, 1933   2 Sheets-Sheet 1

Inventor
Fred W. Juengst
Oscar M. Anderson

By *H. Clay Lindsey*

Attorney

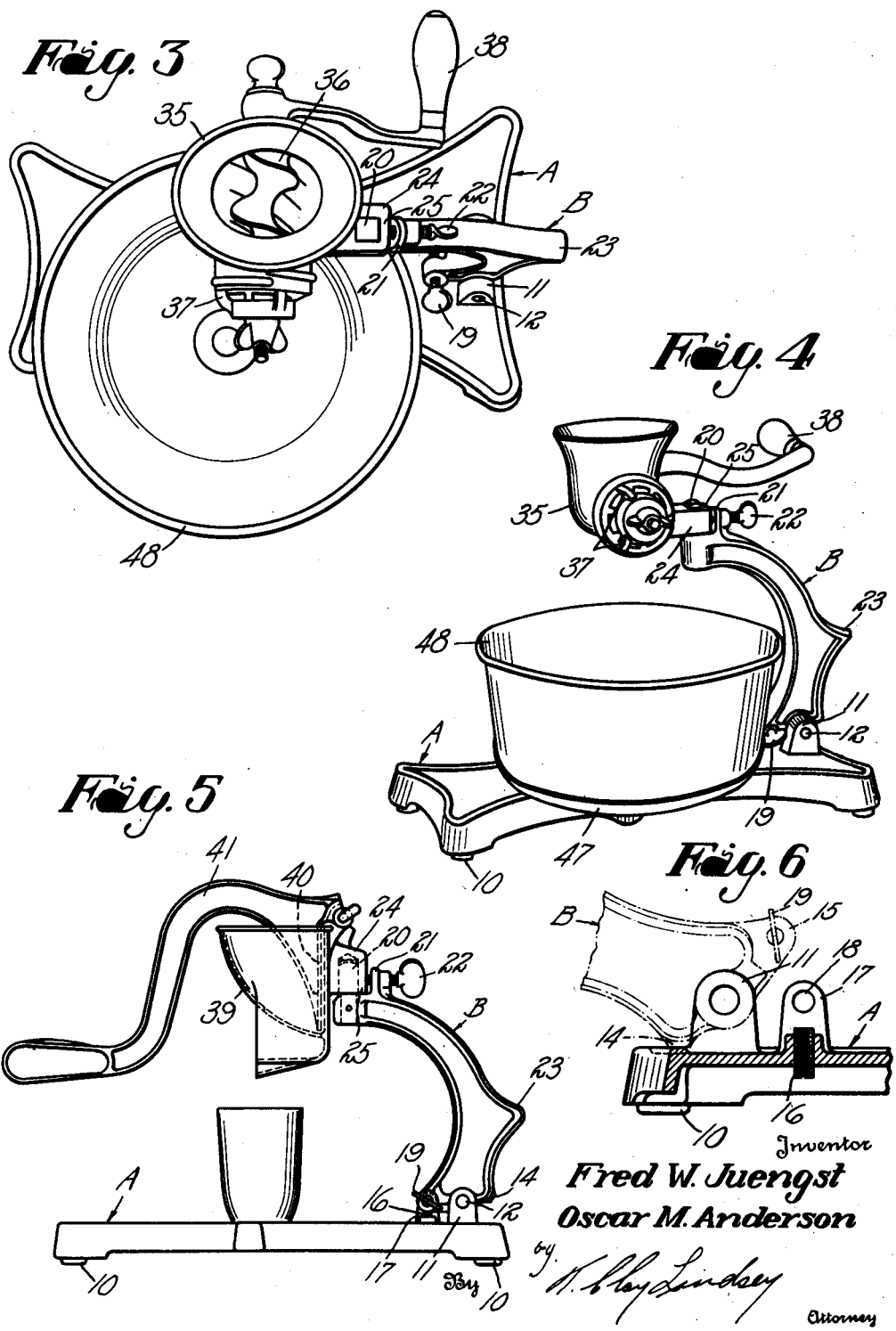

Patented July 11, 1933

1,918,186

UNITED STATES PATENT OFFICE

FRED W. JUENGST AND OSCAR M. ANDERSON, OF NEW BRITAIN, CONNECTICUT, ASSIGNORS TO LANDERS, FRARY & CLARK, OF NEW BRITAIN, CONNECTICUT, A CORPORATION OF CONNECTICUT

SUPPORT FOR CULINARY APPLIANCES

Application filed March 18, 1933. Serial No. 661,456.

The present invention relates to improved means for interchangeably supporting a variety of household appliances for preparing food such as, for example, a mixer or beater, a food chopper unit, a fruit juice extracting device, a coffee grinder, a potato masher, a vegetable slicer, et cetera.

The aim of the present invention is to provide a support of this sort having various features of novelty and advantage and which is of particular serviceability and convenience in supporting any one of a wide variety of appliances, and receptacles adapted to be used in connection with those appliances. In accordance with the present invention, the arrangement is such that the several appliances may be assembled on, and dismantled from, the support with facility; the selected unit is rigidly held in place and, when desired, may be rocked from an operative to an inoperative position, or locked against movement from an operative position; the receptacles may be positioned upon the base so as to associate the same to the best advantage with the various units or appliances; and the base may be rigidly held against movement by one hand of the operator while the other hand is employed for operating or controlling the appliance.

A further aim of the invention is to provide an improved support of this kind which is of simple construction, which will withstand abuse or severe service, and which, while relatively compact and light in weight, is so proportioned and balanced that it may be readily handled, and hold the various instrumentalities to the best advantage.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein we have shown our improved supporting means in connection with several kitchen appliances of different types, Fig. 1 is a top plan view of the support itself, the pair of beaters and a receptacle being shown in dotted lines so as to illustrate the position of those elements when a mixing unit is held upon the support;

Fig. 3 is a top plan view showing a food chopper and receptacle mounted upon the support;

Fig. 4 is a perspective view of what is shown in Fig. 3;

Fig. 5 is a side elevational view showing a juice extractor mounted upon the support;

Fig. 6 is a sectional view taken centrally and longitudinally through the rear end of the base, the lower end of the pivoted arm or standard being shown in dotted lines.

Figure 1:
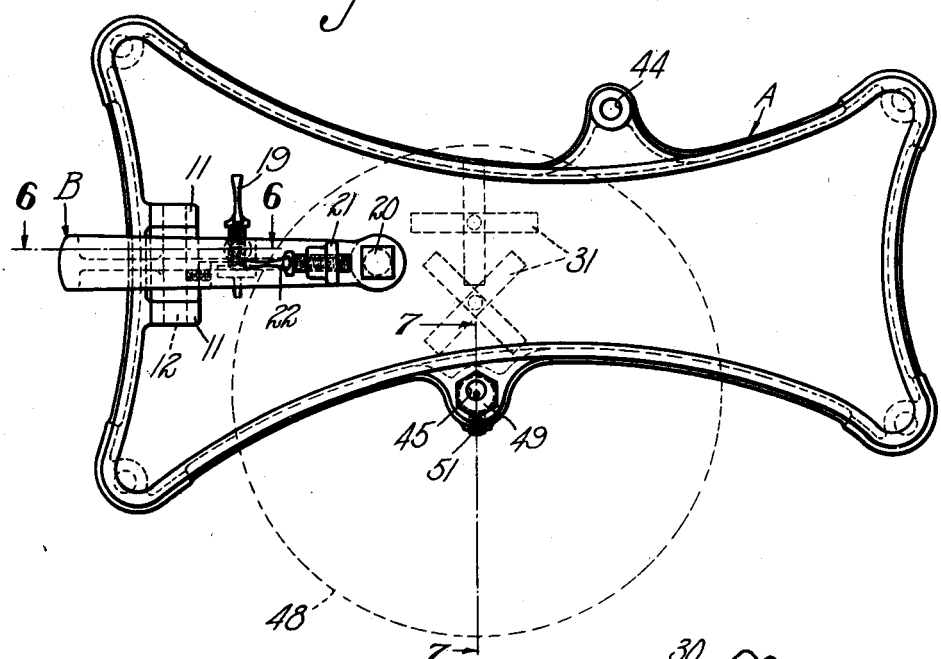

Referring to the drawings in detail, our improved support includes a base A which may be of any suitable construction or shape, but which is here shown as comprising a hollow casting with concave or inwardly curved sides so that the base is relatively narrow at its central portion and gradually increases in width as it progresses towards its opposite ends. The rear end, that is, the end from which the standard rises, is preferably, but not necessarily, wider than the forward end of the base. Located at each corner of the base is a foot 10 preferably of non-metallic material so that these feet will not scratch the surface upon which the base rests. Rising from the base at one end thereof is a pair of spaced apart apertured ears 11 adapted to receive a hinge or pivot pin 12 on which is swingably mounted a standard or arm B located in a plane which includes the medial longitudinal line of the base. This arm or standard is preferably curved upwardly and forwardly so that its upper end overhangs the base. At the rear lower corner of the arm is a stop shoulder 14 adapted to engage the rear marginal edge of the base in order to limit the rearward movement of the arm. The arm has, forwardly of the pivot 12, a stop shoulder 15 adapted to engage the upper end of a stop 16 carried by the base for vertical adjustment. This stop 16, in the present illustrated disclosures, is in the form of a screw threaded in an opening in the base, as shown most clearly from Fig. 6. For the purpose of locking the arm in its operative position, as shown in Figs. 3 to 5, the base is provided alongside of the stop 16 with an upwardly extending lug 17 having a conical recess 18, and the arm carries a set screw 19 the tapered end of which is adapted to engage in the recess 18.

For the purpose of interchangeably yet rigidly securing the various appliances to the upper end of the standard, the standard, at its upper end, is provided with an upwardly extending square stud 20 behind which is an ear 21 through which is threaded a set screw 22. The arm has, between its ends and on its rear side, an extension or elbow 23 by means of which the arm may be very easily and readily thrown from its operative to its inoperative position, as hereinafter explained more in detail.

The various instrumentalities or appliances adapted for mounting upon the upper end of the standard are each provided with a square socket 24 having a wall 25 adapted to be positioned between the stud 20 and the ear 21. The set screw 22 is adapted to be tightened up against this wall so as to rigidly hold the appliance in place with respect to the arm.

Figure 2:
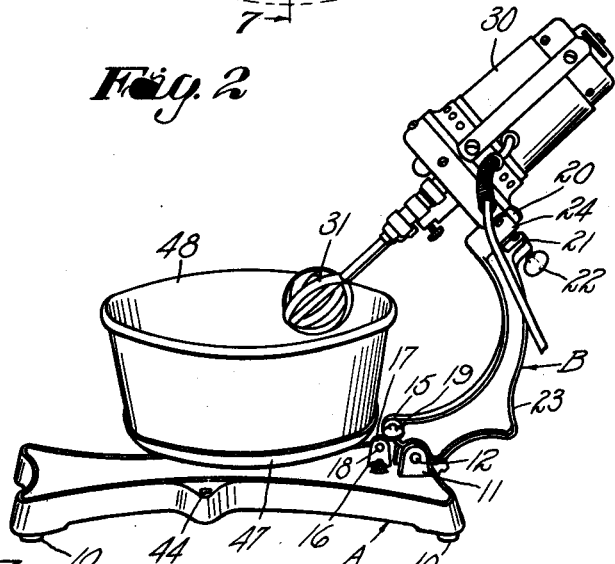
Fig. 2 is a perspective view showing the improved supporting means with the mixing unit supported thereon, the unit being swung back into inoperative position.
Figure 7:
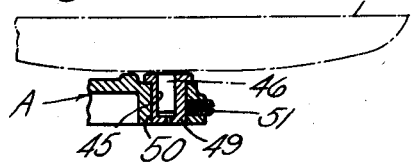
Fig. 7 is a transverse sectional view taken substantially on the line 7—7 of Fig. 1, the turntable also being shown in dotted lines.

In Fig. 2, the appliance is illustrated as being in the form of a motor driven mixer, the appliance having a motor casing 30 and a pair of the usual beaters each comprising a pair of ringlike members 31 disposed in planes at right angles to one another. In Figs. 3 and 4, the kitchen appliance is shown as being in the form of a food chopper, the same having a casing or frame 35; a spiral feed screw 36 for feeding the food or meat to and through the usual cutters 37; and a handle 38 on the feed screw for manually rotating the same. In Fig. 5, the support is shown as holding a juice extractor or squeezer of the type having a cup or receptacle 39 against one wall of which half an orange or the like is adapted to be squeezed flatwise by a pivoted presser plate 40 having a forwardly extending handle 41. The support is also adapted to interchangeably receive other kitchen appliances than those illustrated, it being understood that the particular appliances disclosed are shown by way of exemplification only.

It is desirable, when using kitchen appliances, to employ receptacles, such as bowls or the like, either for holding the food while it is being operated upon, or for receiving the food after it has been operated upon, and as the various appliances have different forms and shapes requiring that a bowl when used in connection with one appliance have a different position than when used in connection with another appliance, we provide means whereby the receptacles may be differently positioned and held upon the base. To this end, the base is provided with a plurality of sockets or openings 44 and 45, in the present instance two, positioned at different distances from the pivot for the arm B and preferably to opposite sides of the longitudinal center of the base, and these sockets are adapted to receive the pivot or fulcrum pin 46 to which is fixed a turntable 47 for supporting receptacles, such as a bowl 48. For example, when a food chopper is mounted upon the standard, the turntable is mounted with its fulcrum pin located in the farthermost socket 44 so that the center of the bowl supported by the turntable is substantially beneath the discharge end; that is, the knifed end, of the chopping device. When a mixer or beater is mounted on the support, the turntable has its pivot pin rotatably mounted in the socket 45 so that the beaters are spaced apart radially with respect to the axis about which the bowl supported by the turntable is turned. With this arangement, upon slowly rotating the bowl and turntable, the ingredients are brought to the beaters, and the beaters do the actual mixing, beating, and stirring operations in the most efficient manner, and the beating action is not interfered with or retarded by the side of the receptacle.

It is further desirable that the socket 45 be adjustable so as to properly correlate the side of the bowl with respect to the blades of the outermost beater, the best action being obtained when the blades of this beater are relatively close to the side of the bowl. To this end, the socket 45 is formed off center or eccentrically in a round stud or socket member 49 mounted for rotatable adjustment in an opening 50 in the base. The upper end of the stud has a square head for receiving a wrench or the like, and the stud may be secured or fixed in any position of adjustment by means of a set screw 51.

After the arm is pivotally connected to the base, it is moved to its operative or upright position and then the stop screw 16 is adjusted so as to bring the stud 20 into plumb. Also, the socket member 49 is angularly adjusted and locked into place for the purpose previously described. These adjustments are provided primarily because the base, being a casting, cannot be made to close tolerances and it is desirable to avoid unnecessary machining operations.

It will be seen from the foregoing description, taken in connection with the accompanying drawings, that our improved supporting means is very simple in construction, economical to manufacture, light in weight, and yet is admirably adapted to support a variety of kitchen utensils in such manner that they may be conveniently operated and controlled to the best advantage. When a mixing instrumentality is mounted on the support, the receptacle may be so located on the support that the beaters are in the proper relation to the receptacle. The beater and motor unit are pivotally supported so as to enable the same to be swung to the angular position shown in Fig. 2, and in which position the beaters are raised to a plane above the receptacle. In this position, the drippings from the beaters may be guided downwardly toward the free end of the beaters and into the receptacle. To throw the pivoted arm, together with the beater appliance, into this inoperative position, it is merely necessary for the operator to press downwardly on the elbow 23 of the arm. When a food chopper, for example, is employed on the support, it is desirable that the chopper have no movement relative to the base and, therefore, the pivoted arm B is locked in its upright or operative position by engaging the screw 19 with the lug 17. By providing the base with concave sides, the base does not interfere with the rotation of the handle 38 and the weight of the base is materially reduced. The base is relatively long, which is an advantage in that tipping of the base endwise is avoided, particularly where a squeezer, such as shown in Fig. 5, is employed in connection with the support. It will be noted that the operating end of the handle of the squeezer 41 extends but slightly beyond the forward end of the base. The portion of the pivoted arm B above the elbow constitutes a handle which may be gripped by the left hand of the operator while the right hand is used to turn the handle of the food chopper or other manually operable instrumentality. By pressing down on this grip or handle portion, the base is urged against the support on which it is located and thus the whole structure is held rigidly against movement.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A support for kitchen appliances including a base, a standard pivoted at its lower end adjacent one end of the base and extending upwardly and forwardly over the base, means on the upper end of said standard for interchangeably securing thereto in a quick detachable manner any one of a plurality of kitchen appliances, a lug extending upwardly from said base forwardly of the pivot for said standard, and a screw carried by said standard and adapted to engage in said lug for securing said standard in operative position.

2. A support for kitchen appliances including a relatively long base having at one end thereof a pair of transversely spaced apart ears, a standard having its lower end positioned between said ears, a pin extending through said ears and standard, said standard extending upwardly and forwardly of the base, a lug arising from said base forwardly of one of said ears, and a screw carried by said standard forwardly of said pin and adapted to engage said lug to secure the standard in operative position.

3. A support for kitchen appliances including a relatively long base, a standard pivoted at its lower end adjacent the rear end of said base and extending upwardly and forwardly of the base, a stop shoulder on the lower end of said standard rearwardly of the pivot and adapted to engage the base for limiting the extent of backward swinging movement of the standard, an upright stud on the upper end of said arm adapted to be received by socket members provided on kitchen appliances, means on the standard for locking the socket members against said stud, a stop shoulder on the lower end of the standard forwardly of said pivot, and a vertically adjustable screw carried by said base and against the upper end of which said last mentioned stop shoulder is adapted to engage.

4. A support for kitchen appliances including a base, a standard arising from the rear end of said base and extending forwardly therefrom, means on the upper end of said standard for detachably connecting kitchen appliances thereto, and a plurality of means on the base spaced at different distances from said standard for positioning receptacles with respect to the appliances.

5. A support for kitchen appliances including a base, a standard arising from the rear end of said base and extending forwardly therefrom, means on the upper end of said standard for detachably connecting kitchen appliances thereto, a platform for holding receptacles with respect to the appliances, and means for holding said platform in different positiors on said base.

6. A support for kitchen appliances including a base, a standard arising from the rear end of said base and extending forwardly therefrom, means for pivotally connecting said standard to said base, means on the upper end of said standard for detachably connecting kitchen appliances thereto, a platform for holding receptacles with respect to the appliances and comprising a turntable having a fulcrum pin, and a plurality of sockets on said base for selectively receiving said fulcrum pin and arranged at different distances from said standard.

7. A support for kitchen appliances including a base, a standard arising from the rear end of said base and extending forwardly therefrom, means on the upper end of said standard for detachably connecting kitchen appliances thereto, a platform for holding receptacles with respect to the appliances and comprising a turntable having a fulcrum pin, a socket adjacent one side of said base for receiving said pin, and a socket adjacent the other side of said base for receiving said pin, said sockets being positioned at different distances from said standard.

8. A support for kitchen appliances including a base, a standard arising from the rear end of said base and extending forwardly therefrom, means on the upper end of said standard for detachably connecting kitchen appliances thereto, a platform for holding receptacles with respect to the appliances and comprising a turntable having a fulcrum pin, a socket adjacent one side of said base for receiving said pin, and a member having a socket adjacent the other side of said base for receiving said pin, said sockets being positioned at different distances from said standard, said socketed member being adjustable.

9. A support for kitchen appliances including a base, a standard arising from the rear end of said base and extending forwardly therefrom, means for pivotally connecting said standard to said base, means on the upper end of said standard for detachably connecting kitchen appliances thereto, said base having a vertical opening at one side, an adjustable member in said opening and having an eccentrically positioned socket, and means for securing said member in any desired position of adjustment within said opening.

10. A support for kitchen appliances including a relatively long base having concave sides, a standard having its lower end pivoted to said base adjacent the rear end of the latter, said standard extending forwardly of said base, means for limiting the extent of pivotal movement of said standard, means for locking said standard in operative position, means on the upper end of said standard for detachably connecting kitchen appliances thereto, a platform for holding receptacles with respect to the appliances and comprising a turntable having a fulcrum pin, a socket adjacent one side of said base for receiving said pin, and an angularly adjustable member having a socket adjacent the other side of said base for receiving said pin, said sockets being positioned at different distances from said standard.

FRED W. JUENGST.
OSCAR M. ANDERSON.